United States Patent
Madnick et al.

(10) Patent No.: US 12,532,959 B2
(45) Date of Patent: Jan. 27, 2026

(54) TOOL FOR CLEANING ELECTRICAL VEHICLE CHARGING COMPONENTS

(71) Applicant: MOC Products Company, Inc., Pacoima, CA (US)

(72) Inventors: Mike Madnick, Pacoima, CA (US); Dean Austin Puett, III, Palmdale, CA (US)

(73) Assignee: MOC Products Company, Inc., Pacoima, CA (US)

( * ) Notice: Subject to any disclaimer, the term of this patent is extended or adjusted under 35 U.S.C. 154(b) by 345 days.

(21) Appl. No.: 18/234,361

(22) Filed: Aug. 15, 2023

(65) Prior Publication Data
US 2025/0057309 A1 Feb. 20, 2025

(51) Int. Cl.
| A46B 5/00 | (2006.01) |
| A46B 9/00 | (2006.01) |
| A46B 13/00 | (2006.01) |
| A46B 13/02 | (2006.01) |
| B60L 53/16 | (2019.01) |

(52) U.S. Cl.
CPC ............ *A46B 13/02* (2013.01); *A46B 5/0095* (2013.01); *A46B 9/005* (2013.01); *A46B 13/001* (2013.01); *A46B 2200/3046* (2013.01); *B60L 53/16* (2019.02)

(58) Field of Classification Search
CPC ....... A46B 5/008; A46B 5/0095; A46B 13/00; A46B 13/02; A46B 9/005; A46B 13/001; B08B 1/12; B08B 1/14
See application file for complete search history.

(56) References Cited

U.S. PATENT DOCUMENTS 6,170,107 B1 * 1/2001 George ................ A46B 13/001
15/23

FOREIGN PATENT DOCUMENTS

WO      WO-2006090343 A1 *  8/2006  ............. A46B 13/02

* cited by examiner

*Primary Examiner* — Shay Karls
(74) *Attorney, Agent, or Firm* — Fulwider Patton LLP

(57) ABSTRACT

A tool for cleaning the charging plug of an electric vehicle is disclosed having a handle, an extension rod, and first and second attachments for cleaning and polishing the surfaces of the charging plug. Within the handle is an electric motor controlled by an exterior switch, and the motor drives a cylindrical driver extending distally from the handle. The extension rod is receiving inside the driver and provides torque to the first and second extensions through rotation of the driver. The first attachment is a brush and the second attachment is a cleaning tube with a foam insert for polishing the pins of the charging plug pins.

4 Claims, 4 Drawing Sheets

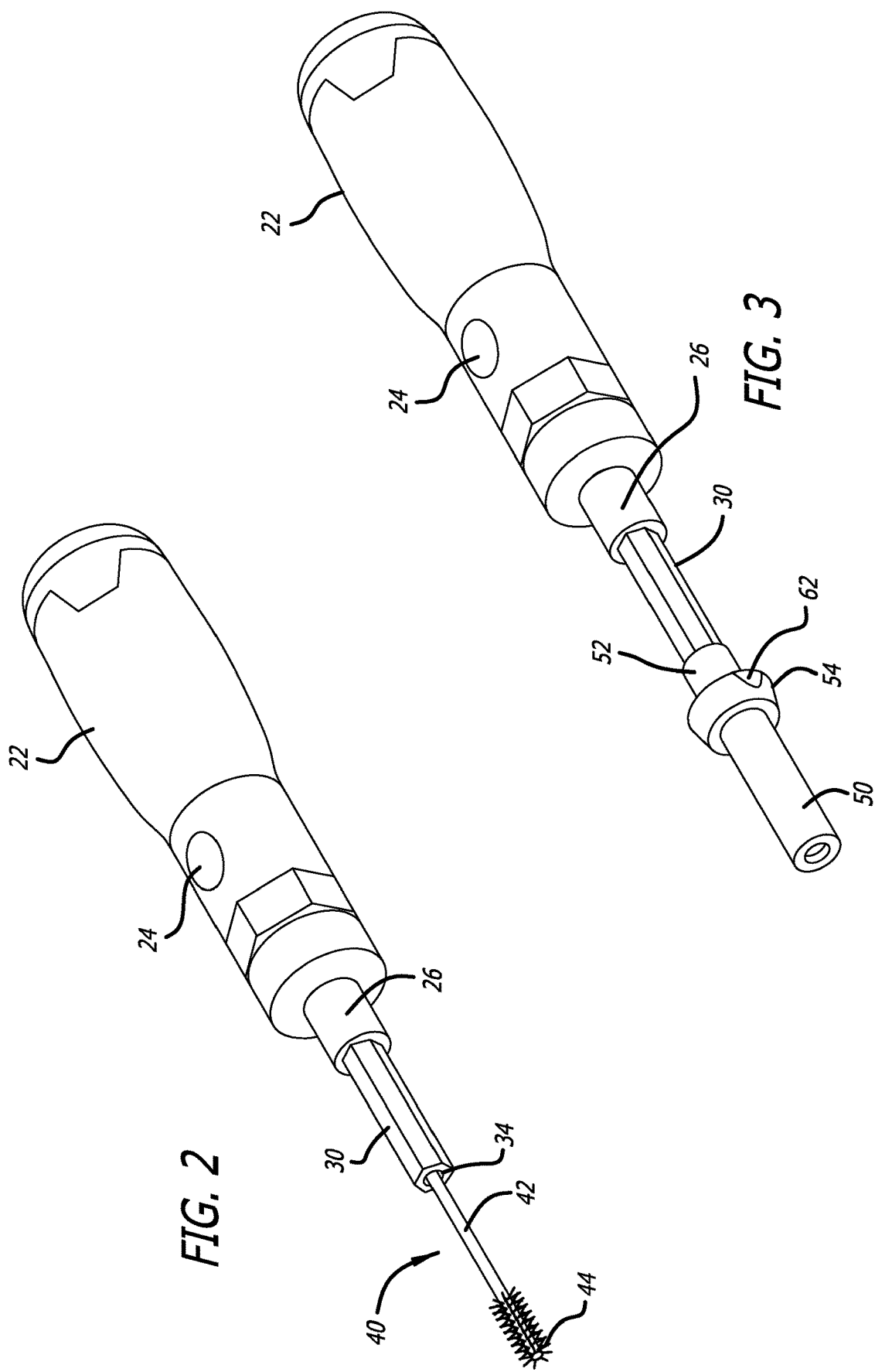

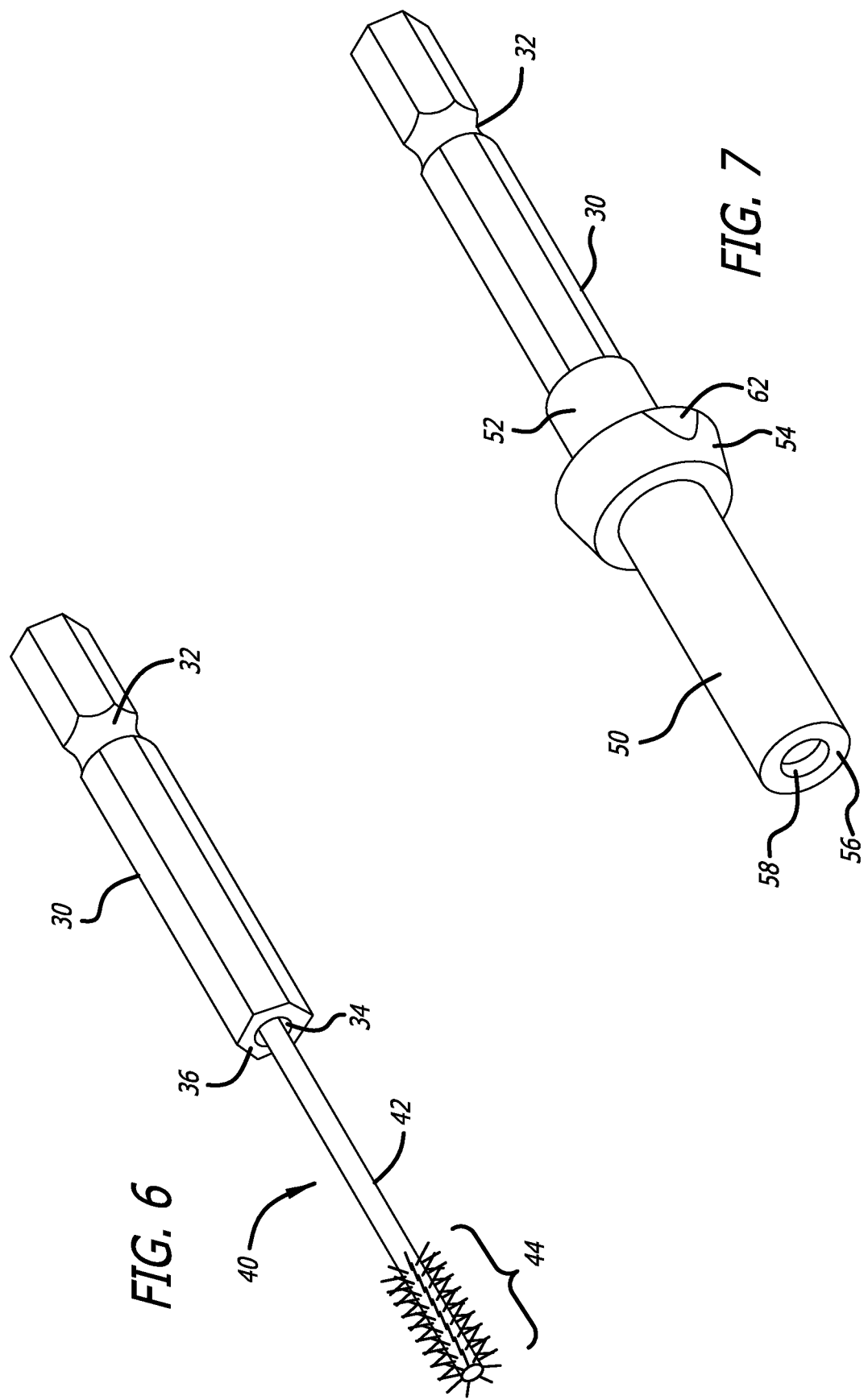

TOOL FOR CLEANING ELECTRICAL VEHICLE CHARGING COMPONENTS

BACKGROUND

Electric vehicle (EV) sales grew by a dramatic 65 percent in 2022, according to Kelley Blue Book parent company Cox Automotive. Like its combustion vehicle brethren, EV vehicles require specific and regular maintenance to ensure proper function and reliability. Practicing routine maintenance on EVs ensures that the vehicle and the charging station are safe to use. This can include regular inspections as electrical components can wear out over time, and inspections and maintenance can identify and address potential safety hazards before they become a problem. Another important benefit of routine maintenance is maximizing uptime. EV drivers rely on the ability to quickly and reliably charge their vehicles, and unexpected downtime can be a major inconvenience. By keeping up with routine maintenance, one can help prevent unexpected outages and ensure your charging stations are always available. Proper maintenance can also improve charging efficiency, reducing charging times and improving the overall user experience. By identifying and addressing issues that can impact charging efficiencies, one can help ensure that EV drivers have a positive charging experience.

EV charging stations can fail for various reasons, but the most common causes include power supply issues, malfunctioning chargers, and poor maintenance. Other common factors may include inactivity, power surges, and software or firmware issues. EV charging stations that are out of service can inconvenience EV drivers and negatively impact their perception of electric vehicles. It's also important for stations to avoid issues such as deferred maintenance, outdated software, obscured operating and payment instructions, and damaged charging connectors. Most EV drivers charge their vehicles at home, but this is not an option for people who live in apartments or dwellings without garages. As EVs become more prevalent, the need for well-maintained charging stations and power storing elements on the vehicle will become more important for drivers.

EV vehicles are a significant investment, and routine maintenance can help protect that investment by extending the lifespan of the equipment. Regular cleaning, lubrication, and component replacement can help prevent wear and tear and prolong the life of the vehicle. Maintenance of both the EV and its charging station is an integral part of ensuring the reliability of electric vehicles. It is essential to regularly inspect and maintain EV charging stations to ensure they are in safe working condition. EV maintenance cleaning includes cleaning charging surfaces and the surrounding area of any debris or dirt accumulated. Visual safety checks include checking the connections, inspecting the cables, and ensuring that all safety features function properly. A thorough power supply inspection verifies the charging station's voltage, current, and power ratings are proper. Inspecting the charging station's wiring for any damage or corrosion ensures that everything is securely fastened and running efficiently.

Of specific interest is the maintenance of the EV batteries. Car batteries organize and store energy efficiently, doling it out to an electric motor and accessories such as air conditioning and high-zoot audio systems. Few technologies evolve at the rapid pace of batteries. That's why today's electric cars nearly all top 200 miles of range on a full charge, while batteries a decade ago were good for only 75 or so miles. There are currently three ways to charge an electric car battery: Level 1: Charging via a household-style outlet. Level 2: Charging via a 220-volt charger commonly installed in garages or available in public stations. Level 3: Charging via a 480-volt direct current (DC) charger for rapid charging. Household outlet Level 1 charging can take overnight to add just 15 or 20 miles, so most EV owners add a Level 2 charger to their homes. Level 3 chargers use power not typically supplied to residential homes.

How long electric car batteries last depends on their construction and how they receive a charge. Manufacturing methods involving battery cell arrangements vary greatly, so there is not a standardized design. Automakers (and battery suppliers) are still discovering the best ways to achieve efficient, portable energy storage.

While these batteries do not usually require every day maintenance, the highly charged surfaces tend to attract dust and particulate, and is subject to corrosion, fouling, and developing a deleterious film on the surface that affects the transfer of electrical energy from the source to the battery. Currently there is no tool or procedure for cleaning the charging surfaces of electric vehicles. The present invention is directed to this objective.

SUMMARY OF THE INVENTION

The present invention is a powered tool for cleaning the surface of electric vehicle's charging components/batteries. The tool includes a motor in a handle that creates a torque on a cylindrical driver. The cylindrical driver has a fitted recess such as a hexagonal or octagonal slot that is sized to receive an elongate adapter rod for transferring the torque generated by the motor to a distal end of the adapter rod. The tool includes two extensions that can be used interchangeably, and attach to the distal end of the adapter rod, the first being a brush element with whiskers and the second is a pin cleaning element with a foam insert. The brush element is used to remove dust, film, and mild corrosion from the surface of the battery pin, and the pin cleaning element polishes and applies a protective foam to the surface of the battery pin.

These and other benefits of the invention will best be understood with reference to the following figures and the detailed description of the invention set forth below.

BRIEF DESCRIPTION OF THE DRAWINGS

FIG. 2 is an elevated, perspective view of the assembled embodiment;

FIG. 3 is another elevated, perspective view of the assembled embodiment;

FIG. 6 is an enlarged view of the first attachment; and

FIG. 7 is an enlarged view of the second attachment.

DETAILED DESCRIPTION OF THE PREFERRED EMBODIMENTS

Figure 1:
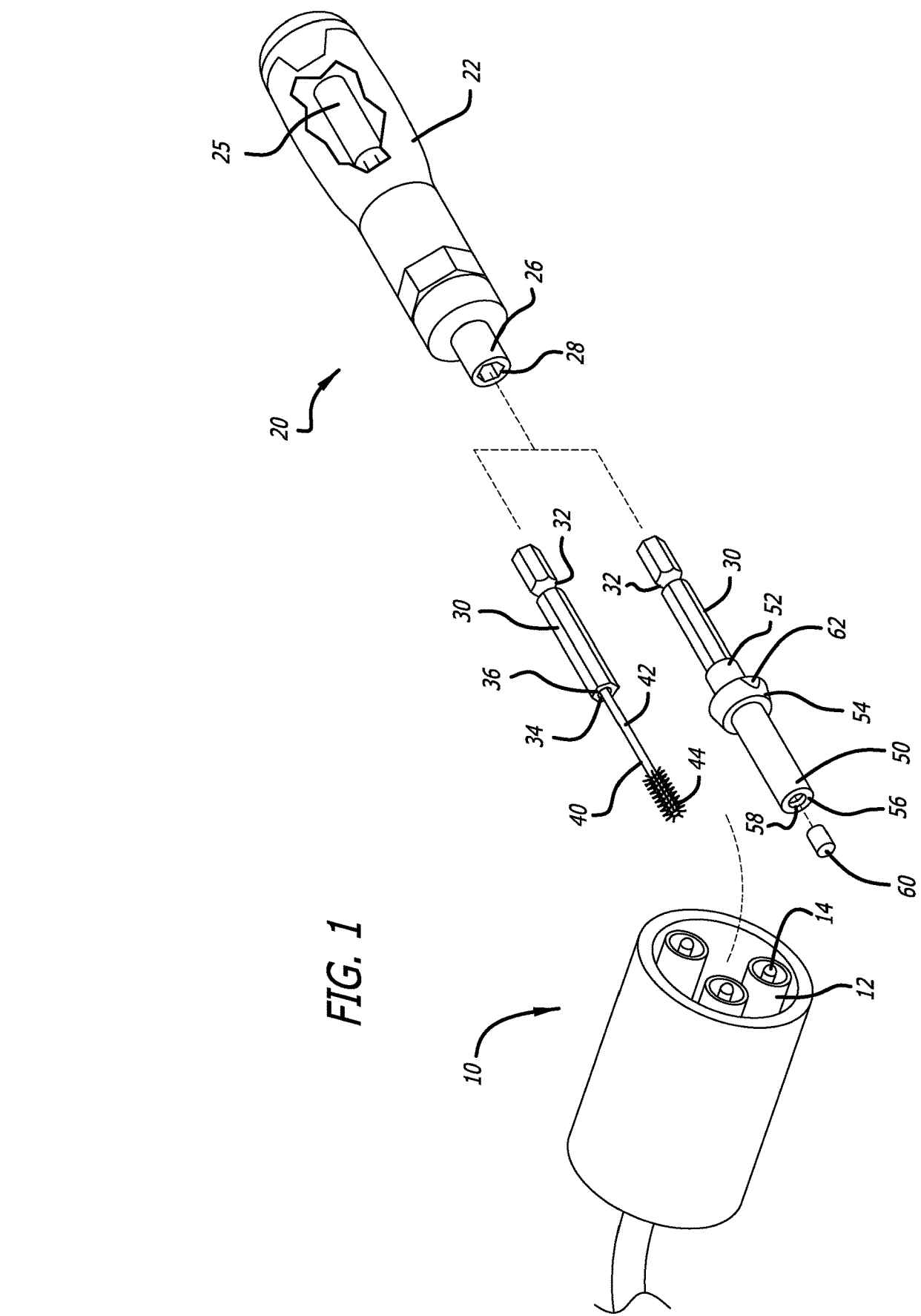
FIG. 1 an elevated, perspective exploded view, partially cut away, of the present invention.

To charge an electric vehicle a charging station is used that is connected to a power grid. The charging station may be a home power station or a public version such as those found in parking lots, truck stops, convenience stores, and other location. Power is delivered to the vehicle to charge the battery, which in turn is used to power the vehicle. FIG. 1 illustrates the connector or plug 10 to makes a connection between the charging station and the vehicle, and includes a plurality of sockets 12 that individually house pins 14. The plug 10 goes into the electric vehicle's inlet (not shown) where charging takes place. The plug 10 and sockets 12 direct the pins 14 that match and connect with the vehicle's configuration to form an electrical circuit. The pins 14 can handle a range of high currents and voltages without overheating or causing electrical arcing.

In the course of using the plug 10, fouling can result as occurs with many electrical components. This fouling can damage the equipment and reduce the charging efficiency, adding duration to the charging process. To address this situation, FIG. 1 illustrates a cleaning tool 20 designed specifically for use with electric vehicle charging stations to clean and polish the surfaces of the plug 10 and the vehicle's mating surfaces.

Cleaning tool 20 is a powered device that uses a motor to generate a torque that spins a tool to clean the surfaces identified above. The tool 20 includes a handle 22 that houses a battery operated motor 25 controlled by a switch 24 on the handle 12. The motor includes a shaft that turns a cylindrical driver 26 extending distally from the handle 22. The driver 26 has a recess 28 at the end, such as a hexagonal recess, for receiving an extension rod 30 therein. Extension rod 30 is shown as a solid rod with a neck 32 at the proximal end and a hole 34 at the distal end 36. The neck 32 is located at a position inside the cylindrical driver 26 when the extension rod 30 is inserted into and locked in the cylindrical driver (see FIG. 2). The profile (e.g., hexagonal) of the extension rod 30 matches the recess 28 in the driver 26 so that, as the driver rotates, the extension rod once inserted into the driver rotates with the same rotational velocity as the driver/motor.

The tool 20 includes two attachments that are used successively to clean and polish the pins and sockets of the plug 10. The first attachment is a brush 40 having an elongate base 42 and a distal end with bristles radially extending outward from the surface. The bristles are preferably nylon or similar material and arranged as rings 44 around the base 42. The second attachment is a cleaning tube 50 having a collar 52 that fits over the extension rod 30 and locks the second attachment 50 onto the tool 20. The cleaning tube 50 has formed on an exterior surface adjacent the collar 52 a frustoconical element 54 that helps to balance the attachment and augment the rigidity of the collar at the transition of the extension rod 30 to the distal end 56 where stresses are highest. The frustoconical element 54 may be formed with beveled edges 62 spaced diametrically apart on the circumference to provide grips for handling the component. The distal end 56 is formed with a circular recess 58 that can receive a foam insert 60. The foam insert absorb a cleaning or polishing material that helps to clean the surface of the pins when the tool 20 is attached to the plug 10.

Figure 4:
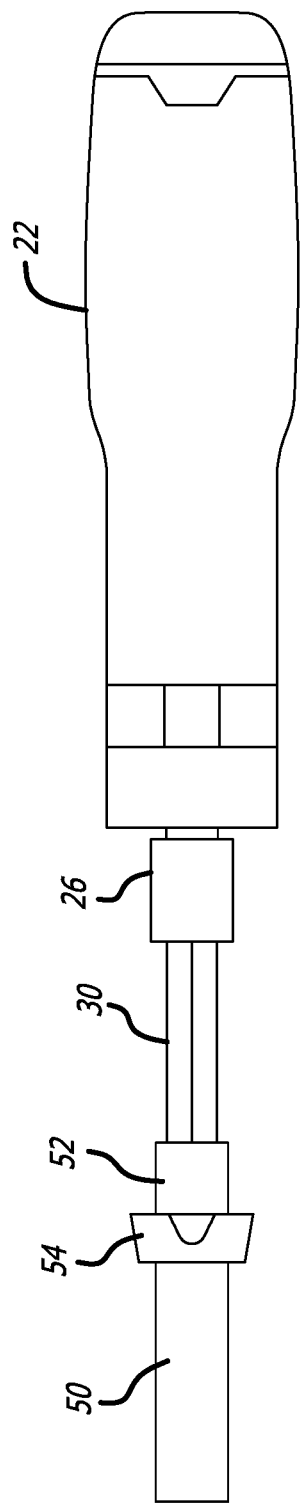
FIG. 4 is a side view of the embodiment of FIG. 3.
Figure 5:
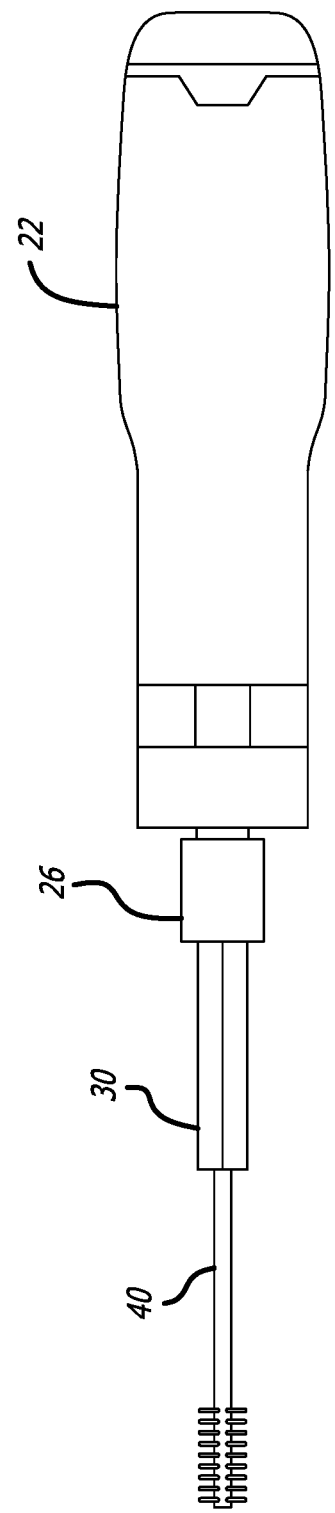
FIG. 5 is a side view of the embodiment of FIG. 2.

FIGS. 2 and 3 show the tool 20 assembled with the first and second attachments, respectively. FIGS. 4 and 5 show side views of the tool with the second and first attachments, respectively. FIGS. 6 and 7 show enlarged views of the extension rod with the first and second attachments, respectively.

While the foregoing has described the inventor's preferred embodiments, the present invention is not limited to the described and depicted embodiments to the exclusion of other embodiments. A person of ordinary skill in the art will readily recognize and appreciate various substitutions, modifications, and alterations of the above described embodiments, and the present invention's scope is intended to include all such substitutions, modifications, and alterations. Accordingly, the present invention's scope is properly determined by the appended claims using their customary and ordinary meanings, without implicating 35 U.S.C. 112 (6), consistent with but not limited to any specific depiction or description herein.

We claim:

1. A tool for cleaning the charging plug of an electric vehicle, comprising:
    a handle having:
        an electric motor with an interior of the handle;
        a switch on an external surface and operably connected to the motor;
        a cylindrical driver rotated by the motor;
    an extension rod coupled to the cylindrical driver, a profile of the extension rod conforming to an interior surface of the cylindrical driver, the extension rod having a hole on a distal surface;
    a first attachment comprising a brush having a base and a plurality of bristles at a distal end, the base configured to be received in the hole of the extension rod; and
    a second attachment comprising a cleaning tube having a proximal collar configured to be received over the distal surface of the extension rod, a frustoconical element spaced from the proximal collar, a circular recess at a distal end, and a foam insert within the circular recess.

2. The tool of claim 1, wherein the extension rod profile is hexagonal.

3. The tool of claim 2, wherein the extension rod includes a neck portion located at a position inside the cylindrical driver.

4. The tool of claim 1, wherein the frustoconical element has beveled edges spaced diametrically apart.

* * * * *